United States Patent

[11] 3,568,976

| [72] | Inventor | Fred W. Thumm |
| | | Wyckoff, N.J. |
| [21] | Appl. No. | 853,776 |
| [22] | Filed | Aug. 28, 1969 |
| [45] | Patented | Mar. 9, 1971 |
| [73] | Assignee | New York Pressing Machinery Corp. |
| | | New York, N.Y. |

[54] VALVE FOR PRESSING MACHINE
7 Claims, 4 Drawing Figs.

[52] U.S. Cl..................................................... 251/63.6, 251/214
[51] Int. Cl....................................................... F16k 31/12
[50] Field of Search........................................... 251/63.6, 62, 61.4, 214

[56] References Cited
UNITED STATES PATENTS

| 1,921,551 | 8/1933 | Temple ........................ | 251/61.4X |
| 3,188,048 | 6/1965 | Sutherland .................. | 251/63.6 |

Primary Examiner—Arnold Rosenthal
Attorney—Blum, Moscovitz, Friedman & Kaplan

ABSTRACT: A valve for a pressing machine formed as a closed unit having a central shaft which controls a valve at one end for permitting the delivery of live steam to a pressing surface, with operation of the valve being controlled by means of a piston at the other end of the shaft operated on by air pressure, with a seal surrounding the shaft to prevent communication between the live steam and the compressed air.

PATENTED MAR 9 1971  3,568,976
FIG. 1  FIG. 2
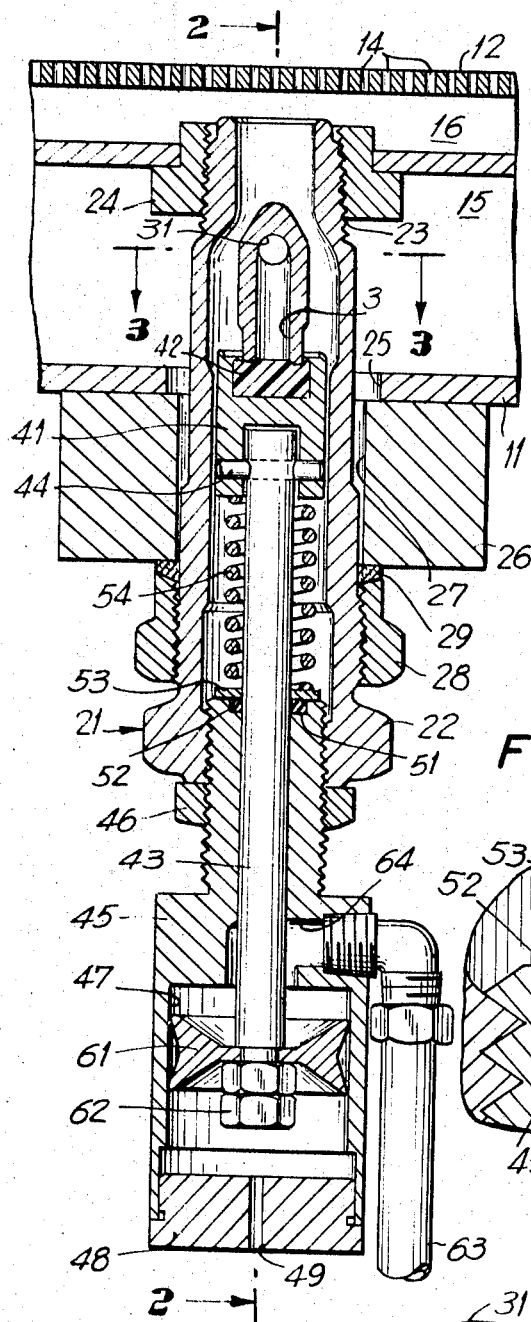
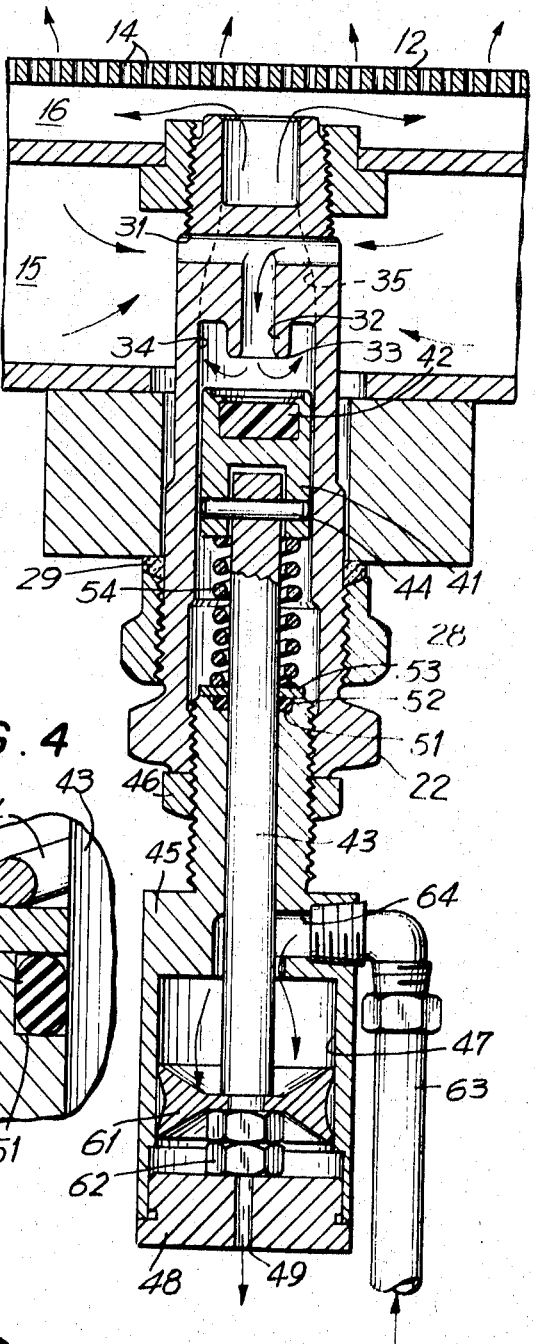
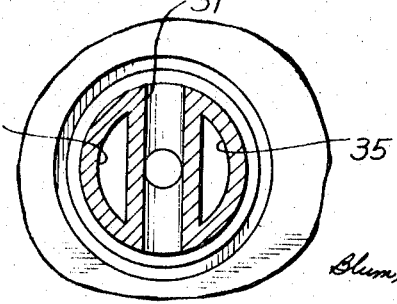
FIG. 3  FIG. 4
INVENTOR.
FRED W. THUMM
BY
Blum, Moscowitz, Friedman & Kaplan
ATTORNEYS

VALVE FOR PRESSING MACHINE

BACKGROUND OF THE INVENTION

This invention relates generally to a valve for a pressing machine for controlling the delivery of live steam to a pressing surface. In the pressing operation, steam under pressure is delivered from a supply source to the buck or head, or both, and a valve controlled by an operator must be provided to control the flow of steam. The use of remotely controlled valves is a common expedient, with air pressure being most commonly used to control operation of the valve.

Since both the steam and the control air are under considerable pressure, care must be taken to avoid an intermixing of the air and steam. This has most commonly been accomplished in the pressing machinery art by avoiding interconnection between the valve chamber which receives the steam and the valve chamber which receives the air, whereby any leakage from either of the chambers will be to atmosphere rather than to the other chamber. Where communication has been possible, complex and expensive sealing means have been required to maintain separate the air and steam.

To provide a valve and control of compact size, it has been found preferable to form the assembly as a closed unit while being certain that there cannot be communication between the air under pressure and the steam under pressure.

SUMMARY OF THE INVENTION

Generally speaking, in accordance with the invention, a pressing machine valve has a valve-controlling piston within a chamber for controlling delivery of steam, with the valve-controlling piston being operated by a shaft within a housing. The housing forms a chamber which receives an operating piston for controlling movement of the shaft by air pressure acting against the controlling piston. A seal surrounding the shaft is held in close engagement with the surface of the shaft under a constantly applied biasing force which also acts to bias the valve to closed position.

Accordingly, it is an object of this invention to provide a valve for a pressing machine having improved means for preventing communication between the controlled steam and the operating air.

Another object of the invention is to provide a valve of improved construction in which biasing means bias the valve to closed position and maintain a seal in sealing position.

A further object of the invention is to provide an improved shaft seal for keeping separate steam under pressure at one side of the seal and air under pressure at the other side of the seal.

Still other objects and advantages of the invention will in part be obvious and will in part be apparent from the specification.

The invention accordingly comprises the features of construction, combination of elements, and arrangements of parts which will be exemplified in the construction hereinafter set forth, and the scope of the invention will be indicated in the claims.

BRIEF DESCRIPTION OF THE DRAWING

For a fuller understanding of the invention, reference is had to the following description taken in connection with the accompanying drawing, in which:

FIG. 1 is a sectional view of a valve constructed in accordance with a preferred embodiment of the instant invention, mounted in the buck of a pressing machine, said valve being shown in closed position;

FIG. 2 is a sectional view taken along line 2-2 of FIG. 1, but showing the valve in open position;

FIG. 3 is a sectional view taken along line 3-3 of FIG. 1; and

FIG. 4 is a partial sectional view, at an enlarged scale, of the shaft and seal construction.

DESCRIPTION OF THE PREFERRED EMBODIMENT

The valve of subject invention is shown mounted in the buck of a pressing machine, it being understood that the valve could also be mounted in a pressing machine head. The buck consists of a bottom wall 11, a top wall 12 and an intermediate wall 13. A plurality of apertures 14 are provided in top wall 12, with the top wall defining the pressing surface. Intermediate wall 13 separates the buck into a steam chamber 15 and a pressing chamber 16. Live steam is continuously delivered to steam chamber 15 through a steam line (not shown) from a remote source (not shown), and the delivery of the live steam from steam chamber 15 to pressing chamber 16 is controlled by the valve of the instant invention.

The valve is indicated generally at 21, with the valve body indicated at 22. The forward end of body 22 is threaded as at 23 to threadedly secure the body to intermediate wall 13 via an annular disc 24 which is secured to the intermediate wall. Bottom wall 11 is provided with an aperture 25 through which body 22 extends, and a block 26 having a body receiving aperture 27 is fixedly secured to bottom wall 11 about aperture 25. A nut 28 is threaded to the body and a sealing ring 29 surrounds the body and is forced into sealing engagement with block 26 by the adjustment of nut 28 to prevent the steam from escaping from steam chamber 25 along the outside surface of the body.

Valve body 22 is formed with a T-shaped opening 31, with the top of the T communicating, at its opposite ends, with steam chamber 15. The base 32 of the T is surrounded by an annular valve seat 33 within a chamber 34 and passages 35 extend from chamber 34 to the end of body 22. Steam is delivered from steam chamber 15 to pressing chamber 16 along the lines of the arrows. The steam enters T-shaped opening 31, travels through the base of the T into chamber 34 and thereafter travels through passages 35 into pressing chamber 16.

To close the valve there is provided in chamber 34 a slidable piston 41 having a recess at its face end in which is secured a sealing disc 42 adapted to tightly press against valve seat 33 to close the valve when piston 41 is in the forward position. A piston rod 43 is connected at one end to piston 41 through a pin 44. The other end of piston rod 43 extends along the longitudinal axis of body 22 away from valve seat 33. A body member 45 is threadedly secured to body 22 at the rear end thereof with a nut 46 locking the body member to the body. Piston rod 43 slidably extends through body member 45 and terminates in a chamber 47 within the body member, the chamber being closed by a plug 48 which has a relief port 49 therethrough.

The forward end of body member 45 within chamber 34 is provided with an annular undercut 51 in which is mounted an O-ring 52. The O-ring completely fills annular undercut 51 and closely surrounds piston rod 43. A washer 53 having an inside diameter sufficient to pass the piston rod with clearance and having an outside diameter greater than the outside diameter of annular undercut 51 is positioned in facing engagement with the end of body member 45 within chamber 34. A spring 54 surrounds the piston rod and acts between washer 53 and a piston 41 to perform two functions. The first function is to bias the piston toward the valve seat to thereby bias the valve to the closed position.

The second function of spring 54 is of prime importance in that it aids in effecting a seal to prevent communication between chambers 34 and 47 to prevent steam or air from traveling from one chamber to the other along the surface of piston rod 43. The dimensions of O-ring 52 are selected to assure that when the O-ring is mounted on the piston rod and pressed into annular undercut 51, the O-ring will project outwardly of the undercut and be contacted by washer 53. Through spring 54, the washer will apply pressure to the O-ring to maintain the O-ring under compressive stress to be certain that the O-ring is tightly held in the annular undercut and closely conforms to the surface of piston rod 43. The O-ring is preferably formed of Teflon, which will withstand the temperatures of the steam, will closely conform to the annular undercut and piston rod under pressure, and will have minimal friction and wear with respect to the sliding action of the piston rod during valve operation.

To the end of piston rod 43 within chamber 47 is secured a piston cup 61 held in position by means of nuts 62. An air line 63 is connected to a passage 64 communicating with chamber 47. Air line 63 is connected to a remote source of compressed air controlled by a remote valve (not shown). The remote valve would normally be controlled by foot pressure by the operator of the pressing machine.

Live steam normally under pressure in the range of 80 to 100 pounds per square inch is continually delivered to steam chamber 15. Valve 21 is maintained closed by the action of spring 54 tightly pressing sealing disc 42 against valve seat 33. When the pressing operation is to take place and the operator desires to have steam delivered to pressing chamber 16, he operates a control valve (not shown) in the air line to permit air under pressure, usually in the range of 60 to 100 pounds per square inch, to be delivered to chamber 47 through air line 63 to act against piston cup 61 to drive the piston cup from the position shown in FIG. 1 (valve closed) to the position shown in FIG. 2 (valve open). On completion of the pressing operation, the control valve is released to relieve air from air line 63 and spring 54 returns the valve to the closed position.

When the valve is in the open position of FIG. 2, live steam under considerable pressure fills chamber 54. Also, air under considerable pressure fills chamber 47. Should the steam under pressure leak along piston rod 43, the live steam could act against piston cup 61 to hold the valve open and control over the valve would thereby be lost. The leakage of compressed air along the piston rod into chamber 34 would have an undesirable cooling effect on the steam which is to be used for pressing and would also reduce the pressure exerted against the piston cup to hold the valve in desired position.

The foregoing construction permits utilization of an effective but relatively simple valve which can be easily controlled, regulated and rebuilt. For example, if it is desired to increase or decrease steam flow, it is merely necessary to change the longitudinal position of body member 45 with respect to body 22. This can be accomplished by loosening nut 46 and rotating the body member with respect to the body to the desired position, whereafter the nut is retightened. Rotation in the counterclockwise direction would increase steam flow by permitting the steam valve to be opened a greater amount, while rotation in the clockwise direction will decrease steam flow when the valve is open. It will also be seen that the valve can be quickly disassembled and reassembled for the replacement of worn parts.

While providing for utilization of a simple construction wherein the steam and air chambers of the valve communicate along the passage in which the piston rod is located, a seal of simple construction has been provided to assure the separation of the chambers with the seal assembly also accomplishing the function of biasing the valve to the normally closed position.

It will thus be seen that the objects set forth above, among those made apparent from the preceding description, are efficiently attained, and since certain changes may be made in the above construction without departing from the spirit and scope of the invention, it is intended that all matter contained in the above description or shown in the accompanying drawing shall be interpreted as illustrative and not in a limiting sense.

I claim:

1. A valve for a pressing machine comprising a body including a first chamber at one end, a second chamber at an opposite end, steam inlet and outlet passages communicating with said first chamber, a valve seat surrounding said inlet passage, an air inlet passage communicating with said second chamber, a bore interconnecting said first and second chambers, and an undercut at an end of said bore within said first chamber, a first piston slidably mounted in said first chamber for engaging said valve seat for closing said valve, a piston rod slidably mounted in said bore and having one end connected to said first piston, a second piston slidably mounted in said second chamber, said second piston being connected to the other end of said piston rod, and biasing apparatus acting between said undercut and said first piston for biasing said first piston toward said valve seat and sealing said first chamber from said bore about said piston rod.

2. A valve as claimed in claim 1, wherein said biasing apparatus includes a sealing ring surrounding said piston rod and extending partially into said undercut.

3. A valve as claimed in claim 1, wherein said biasing apparatus includes a sealing ring adjacent said undercut, a plate in contact with a surface of said sealing ring and a spring acting between said plate and said first piston.

4. A valve as claimed in claim 3, wherein a portion of said sealing ring is received in said undercut and said plate biases said sealing ring into said undercut.

5. A valve as claimed in claim 4, wherein said undercut is annular and said sealing ring is an O-ring.

6. A valve as claimed in claim 5, wherein the depth of said undercut is less than the thickness of said O-ring, whereby, when said O-ring is located in said undercut, a portion of said O-ring extends into said first cylinder for engagement by said plate and said spring acting on said plate urges said O-ring into said undercut and in close engagement with said piston rod.

7. A valve as claimed in claim 6, wherein said O-ring is fabricated of Teflon.